United States Patent [19]

Brauer

[11] 4,442,517

[45] Apr. 10, 1984

[54] STYLUS PROTECTING MECHANISM FOR VIDEO DISC PLAYER

[75] Inventor: Eric A. Brauer, Danville, Ind.

[73] Assignee: RCA Corporation, New York, N.Y.

[21] Appl. No.: 449,315

[22] Filed: Dec. 13, 1982

[51] Int. Cl.³ .............................................. G11B 3/58
[52] U.S. Cl. ...................................... 369/71; 369/170
[58] Field of Search ................................ 369/71, 170

[56] References Cited

U.S. PATENT DOCUMENTS

| 4,046,384 | 9/1977 | Kirschner | 369/71 |
| 4,166,623 | 9/1979 | Nanbu et al. | 369/71 |
| 4,285,524 | 8/1981 | Hughes et al. | 369/71 |

FOREIGN PATENT DOCUMENTS 55-28570  2/1980  Japan ..................................... 369/71

Primary Examiner—Steven L. Stephan
Attorney, Agent, or Firm—E. M. Whitacre; W. H. Meise; D. A. Kulkarni

[57] ABSTRACT

The stylus arm carriage is provided with a slidably-mounted plunger. When the carriage is driven to an off-record home position, a portion of the front wall of the player engages a protruding end of the plunger to drive it in. The other end of the plunger engages a carriage-mounted stylus cleaner mechanism to lock it in place while the carriage is disposed at the home position to prevent the possibility of accidental contact between a pickup stylus and the cleaner mechanism.

5 Claims, 9 Drawing Figures

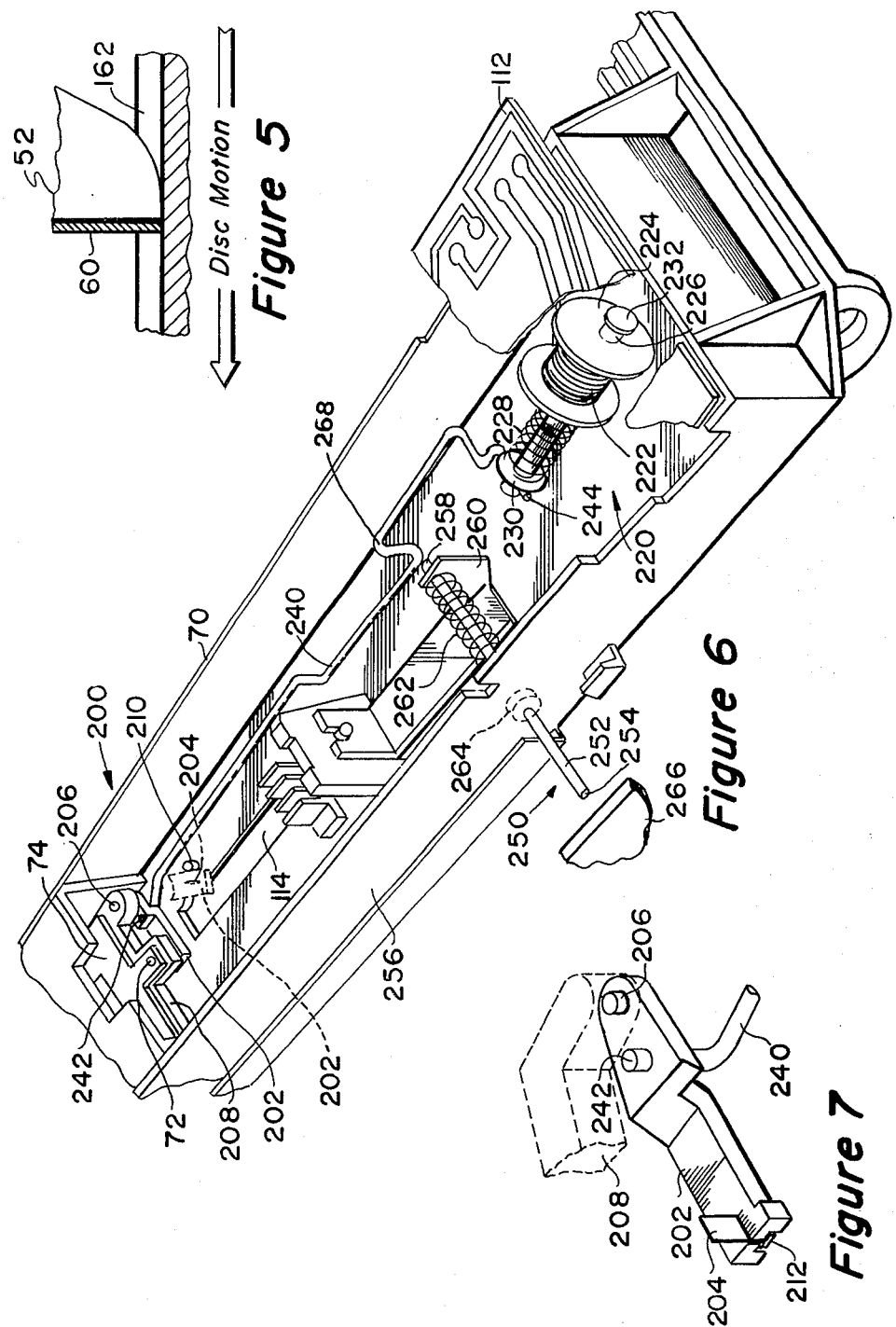

STYLUS PROTECTING MECHANISM FOR VIDEO DISC PLAYER

The present invention generally relates to a video disc player and, more particularly, to a system for protecting the pickup stylus.

There are several applications where it is desirable to automatically clean the stylus tip to get rid of accumulated dust and debris which might otherwise obscure the desired signal recovery. Such applications may arise in the context of audio and audio-video systems for recovering information recorded on a disc record medium.

One such application is the capacitive type video disc system. Here, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

In the video disc systems, the information track density is generally quite high. For example, one commercially available system uses a spirally-grooved information track with a groove density of nearly 10,000 grooves per inch (groove width=approximately 2.5 micrometers). During playback, the stylus tip is received in the groove and guided toward the record center as a turntable-supported record revolves as the desired speed. The microscopic groove geometries require a stylus that has rather fine dimensions (e.g., stylus tip width=2 micrometers, stylus tip length=5 micrometers and stylus tip height=3 micrometers). It is generally the practice with such high density records (both grooved and flat records) to mount the signal recovery stylus in a protective cartridge which, in turn, is installed in a translatable carriage. The bottom wall of the carriage has an elongated aperture through which the stylus is selectively lowered onto a turntable-supported record. The carriage is driven to cause it to follow the radially inward motion of the groove-guided stylus. Typically, a mechanism to lift and lower the stylus to effect stylus/record disengagement and engagement is located in the carriage. See, for example, U.S. Pat. No. 4,266,785 which issued to T. W. Burrus on May 15, 1981.

It is also known that the quality of the recovered signal is affected by such things as microscopic dust and debris adhering at the base of the pickup stylus or under the stylus shoe. The dust referred to here can come from the atmosphere. The debris, on the other hand, can come out of the information track as the stylus rides in the record groove.

In video disc players, it is advantageous to provide the ability to quickly locate a precise segment of the prerecorded program on a disc. To this end, the player is subject to disposition in one of four search modes—i.e., visual search (forward/backward) and rapid access (forward/backward). In visual search, the stylus is rapidly swept across the record while in engagement therewith (at 16 times the normal playback speed). In rapid access, the stylus is rapidly moved sideways while in engagement with the record at a much greater speed (at 120 times the normal playback speed). During high speed visual search, there is a potential for a buildup of dust and debris around the stylus to the extent that the stylus shoe is physically separated from the record, causing degradation or even loss of signals (i.e., carrier distress) at the output of the stylus.

It is desirable to free the stylus of accumulated dust and debris as indicated before. U.S. patent application of Brauer et al., entitled "IN-ARM STYLUS CLEANER FOR DISC RECORD PLAYER", discloses a carriage-mounted mechanism for cleaning the stylus whenever a carrier distress condition occurred during playback. The therein-disclosed stylus cleaner mechanism includes a stylus wiping element holder mounted in the carriage arm for a to-and-fro motion between an advanced position and a retracted position. A selectively-actuated sequencing means, which when activated, retracts the holder when the stylus is down, raises the stylus back up into the carriage arm, releases the holder to return to its initial position while the stylus is up to permit a holder-mounted stylus cleaning element to wipe the raised stylus, and then lowers the stylus back down on the record to resume playback operations.

It is desirable to prevent accidental engagement between the stylus arm assembly and the stylus cleaner. The inadvertent stylus/cleaner contact might, for example, occur during handling and shipping activities, which might set up vibrations causing the stylus arm and the cleaner arm to move around.

The stylus protecting mechanism, in accordance with this invention, comprises a sensing means subject to conditioning in a first state and a second state in response to the disposition of the carriage in a playback mode and a standby mode respectively. The carriage position sensing means, when disposed in the standby mode, locks the stylus cleaner arm in place to reduce the possibility of stylus damage during handling and shipping.

According to a further feature of the invention, the carriage-position sensing means also acts to restrain the stylus lifting/lowering apparatus to prevent accidental lowering of the stylus arm when the carriage is in the standby mode.

In the drawings:

FIG. 1 is a perspective view of a video disc player utilizing a stylus protecting apparatus of the present invention;

FIG. 2 gives a perspective view of a stylus cartridge suitable for use with the subject invention;

FIG. 5 illustrates the stylus/record interface;

FIG. 6 depicts the cooperation between the present stylus protecting apparatus and a stylus cleaning mechanism housed in the FIG. 3 carriage arm;

FIG. 7 portrays certain details of the carriage-mounted stylus cleaner mechanism; and FIGS. 8 and 9 indicate variations of the subject stylus protecting apparatus.

Figure 1:
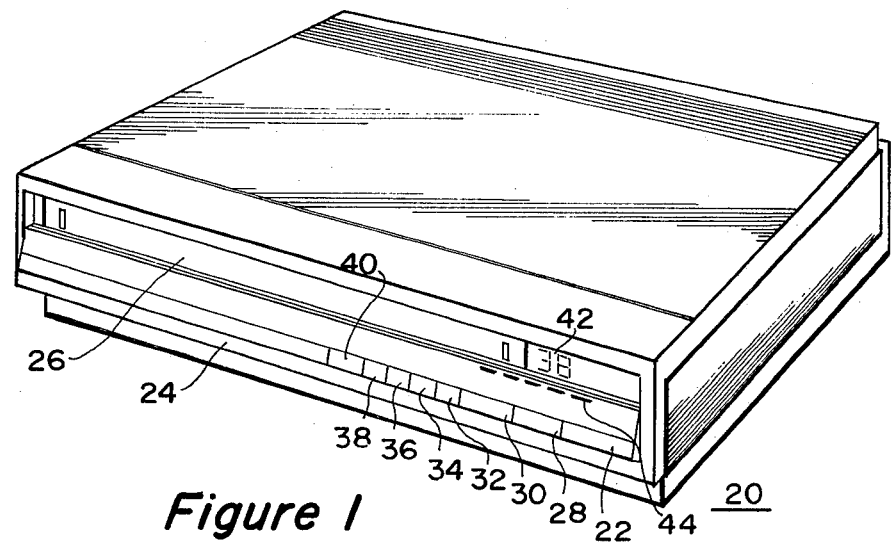

Shown in FIG. 1 is a video disc player 20 incorporating the present stylus protecting mechanism. To play a disc, the player is turned on by pressing the POWER button 22 located on the front panel 24. A full record caddy is inserted into the player through a caddy input slot 26, and the empty caddy sleeve is then extracted therefrom leaving the enclosed record/spine assembly inside the player. The record is automatically deposited on the turntable, and played back through a conventional television receiver. At any point during playback, the viewer can reject the remainder of the record by depressing the REJECT button 28, or interrupt the program by activating the PAUSE button 30. In the PAUSE mode, the pickup stylus is raised, and its lateral motion is arrested. When the PAUSE button 30 is operated again, the stylus is lowered and the playback is resumed. A set of pushbuttons 32, 34, 36 and 38 are arranged on the instrument panel 24 to dispose the player in any one of four search modes—i.e., visual search (forward/reverse) and rapid access (forward-/reverse)—to enable the viewer to quickly locate a precise section of the prerecorded program. In visual search, the stylus is rapidly moved across the record (16X) while in engagement therewith. In rapid access, the stylus is swept across the record at a much greater speed (120X) while the stylus is down. The player has a CHANNEL A/B button 40 to select any one of two audio channels in the event of a bilingual program disc. An LED indicator 42 shows the elapsed playing time. Various player functions—such as SIDE 1-2, CHANNEL A/B, STEREO—are indicated by a plurality of light indicators 44.

Figure 2:
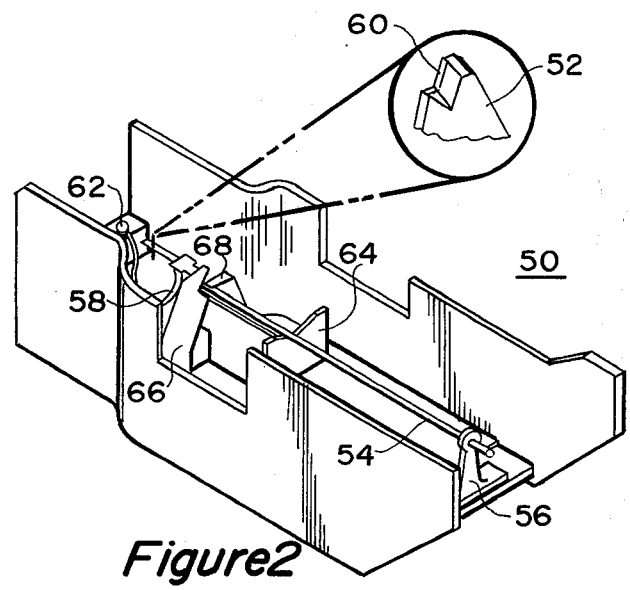

FIG. 2 is a perspective view of a stylus cartridge 50, shown upside-down, comprising a stylus 52 firmly secured at one end of an elongated, tubular stylus arm 54. The other end of the stylus arm 54 is flexibly suspended in the cartridge enclosure by a thin compliant suspension 56. The stylus tip is about 2 micrometers wide, 5 micrometers deep and 3 micrometers high. The stylus arm 54 is in the form of a hollow aluminum tube with the following dimensions: length=1.654 inches, outside diameter=0.044 inches and inside diameter=0.040 inches. A leaf spring or flylead 58, about 0.000560 inches thick, is connected at one end to a thin electrode 60 on the stylus 52. The end of the stylus electrode 60 is about 2 micrometers wide by 0.2 micrometers thick. The other end of the flylead 58 is connected to a terminal 62 disposed on the cartridge body. The flylead 58 provides the stylus/record engagement force, and also serves as the electrical connection between the stylus electrode 60 and the pickup circuitry located within the carriage arm. The stylus arm 54 is held back within the confines of the cartridge housing against a stop 64 by a set of retaining fingers 66 and 68. When the cartridge 50 is installed in the player, the retaining springs 66 and 68 are automatically spread apart to release the stylus arm 54.

Figure 3:
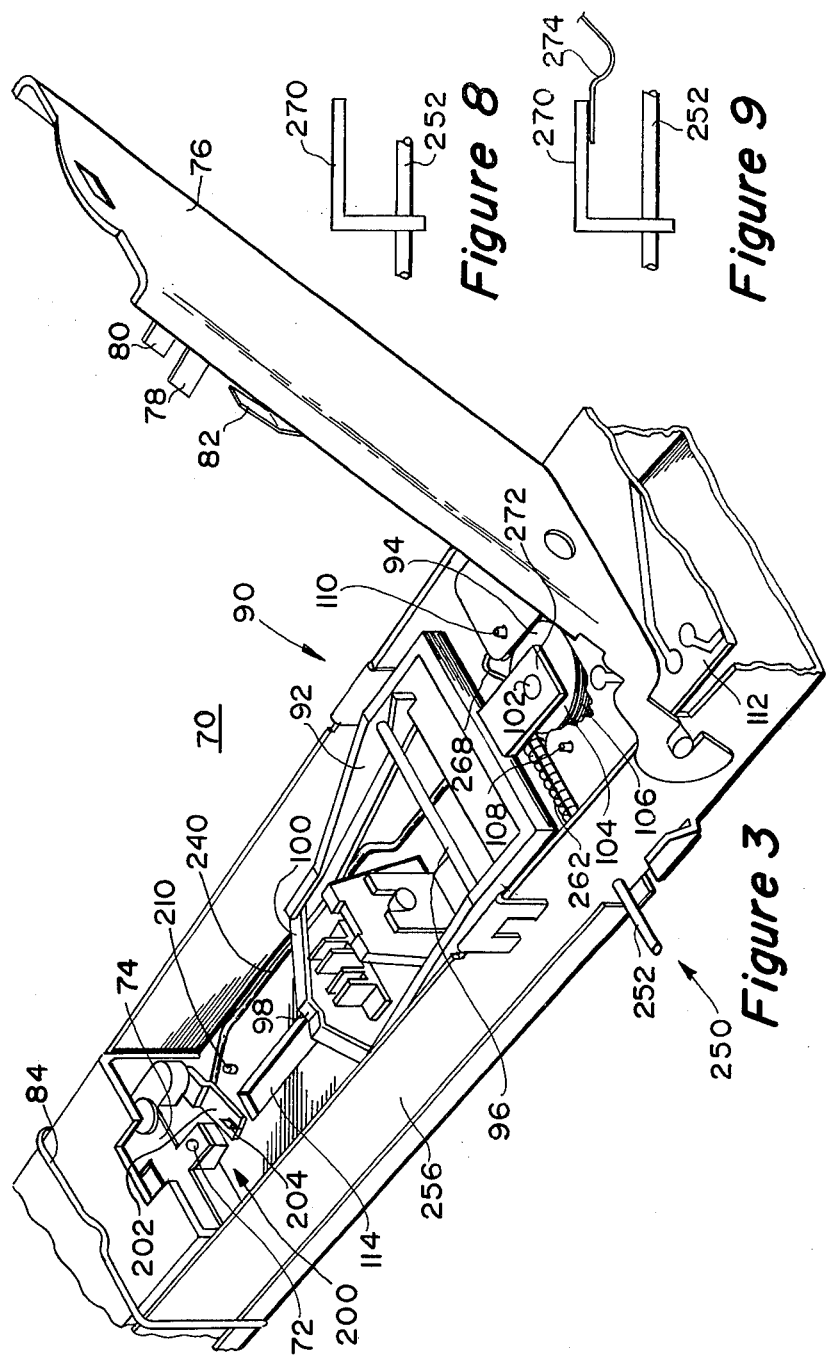
FIG. 3 represents an isometric view of a carriage arm translatably mounted in the FIG. 1 player in which the instant stylus protecting apparatus is located.

The stylus cartridge 50 is installed in a carriage 70 shown in FIG. 3. The carriage 70 is translatably mounted in the player in the manner described later. The terminal 62 disposed on the cartridge case engages an input terminal 72 of the pickup electronics 74 housed in the carriage 70 upon reception of the cartridge therein. The carriage lid 76 is fitted with a pair of depending tabs 78 and 80, which engage and spread apart the stylus arm retaining springs 66 and 68 to free the stylus arm 54 when the carriage lid is closed. A leaf spring 82 arranged on the underside of the carriage lid 76 holds the cartridge 50 in place. A wire hoop 84 is provided to lock the carriage lid 76.

The carriage 70 is further equipped with a stylus lifting/lowering device 90 comprising a pivotally-mounted, stylus arm bracket 92 and a selectively-actuated electromagnet 94. The stylus arm bracket 92 is swingably mounted in the carriage 70 about a cross rod 96. When the cartridge 50 is positioned in the carriage 70 and the lid 76 is locked shut, the stylus arm 54 comes to rest in a raised position in a centering depression 98 provided on the cross member 100 of the stylus arm bracket 92. Depending downwardly from the other side of the stylus arm bracket 92, and fixedly secured thereto, is a permanent magnet 102. The permanent magnet 102 has a portion extending into an air gap defined by a nonmagnetic core 104 of the electromagnet 94. Disposed about the core 104 is an electrical winding 106 having a pair of terminals 108 and 110 connected to an energization means 112. In the normal condition—i.e., in the absence of signals applied to the electromagnet 94—, the distribution of the weight of the stylus arm bracket 92 is such that the stylus arm 54 is held in the lifted position. When an appropriate signal is applied to the terminals 108 and 110, the bracket-mounted magnet 102 is repelled out of the air gap of the electromagnet to slowly set the stylus 52 down. The energization means 112, when actuated, applies a particular form of signal to the electromagnetic device 90 to assure a gentle stylus set down. The bottom wall of the carriage 70 has an elongated opening 114 to permit the stylus 52 to pass out of the confines of the carriage when the stylus lifting/lowering mechanism 90 is activated.

As will be evident from the brief description of the operation of the video disc player, there are several modes of operation in which the stylus 52 is lowered or lifted. For example, the stylus lifting/lowering device 90 is activated to lower the stylus 52 on a turntable-supported disc for playback, or on a wiping pad for cleaning the stylus tip. The signals are removed from the terminals 108 and 110 of the electromagnet coil 106 to raise the stylus 52 back up into the carriage 70 when the player is set in the PAUSE or OFF modes.

Figure 4:
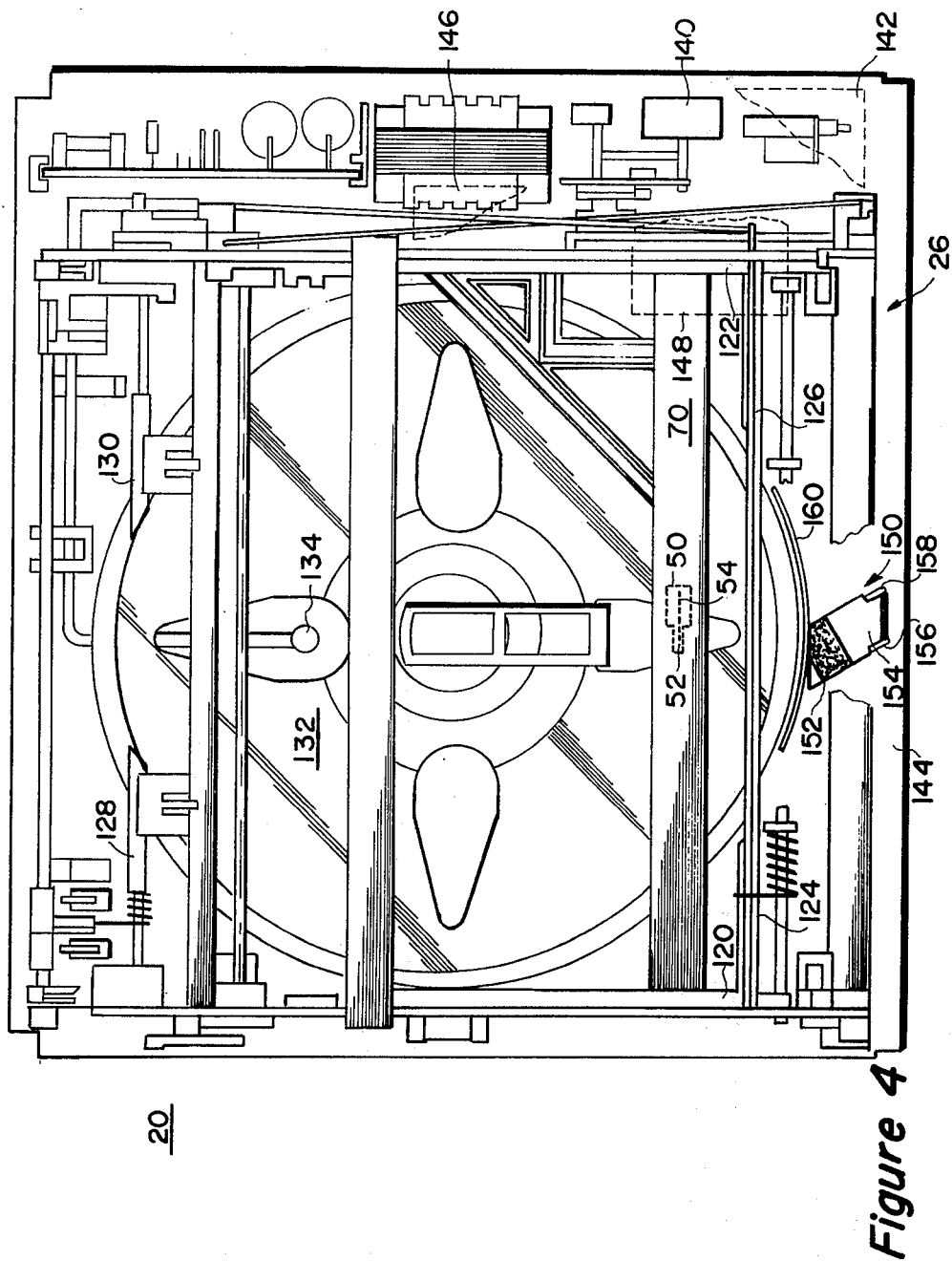
FIG. 4 shows a top view of the video disc player of FIG. 1 with its cover removed to show the underlying details.

Referring to FIG. 4, the pickup carriage 70 is mounted in the player for motion between an off-record rest position and an on-record, end-of-play position along a path defined by a pair of guide rails 120 and 122. A record is loaded into the player by inserting a full caddy into the player. Upon the extraction of the empty sleeve from the player, the enclosed record is left therein resting on a set of receiving pads 124, 126, 128 and 130. The retained record is automatically transferred to a rotatable turntable 132 by a record transfer mechanism including a record handling finger 134. A motor located underneath the turntable 132 drives it to rotate at the desired speed (e.g., 450 rpm). U.S. patent application, Ser. No. 374,377, filed for Hughes, and entitled "DISC PLAYER HAVING RECORD HANDLING APPARATUS", describes a suitable record extraction and transfer mechanism.

A stepper motor 140 drives the carriage 70 from the off-record rest position to a starting position over the turntable-supported record, and the stylus arm lifting/lowering device 90 is energized to lower the stylus 52 onto the record. During playback, the carriage 70 is driven toward the record center so as to cause it to track the radially-inward motion of the stylus 52. The signals at the output of the reproducing stylus 52 are processed by the pickup circuits 74 housed in the carriage 70, and fed to signal processing circuitry disposed on a signal board 142 attached to the centerplate 144 of the player. The signal processing circuitry converts the signals at the output of the pickup circuits 74 into a form suitable for application to a conventional television receiver. When the carriage 70 reaches the end-of-play position, the stylus 52 is raised and the carriage is driven back until it operates a microswitch to reset it at its off-record rest position. The record is automatically transferred back to the record receiving pads 124, 126, 128 and 130. The record is then retrieved from the player by inserting an empty sleeve into the player and withdrawing it therefrom.

Disposed on the signal board 142 are two microcomputers—a mechanism microcomputer 146 and a player control microcomputer 148. The mechanism microcomputer 146 is responsible for sequencing and controlling the caddy loading/unloading mechanism, record transfer mechanism and turntable drive mechanism. The player control microcomputer 148 has the responsibility for sequencing and controlling the carriage drive mechanism, stylus lifting/lowering mechanism and other player control functions.

During playback, the stylus 52 encounters groove defects which have a tendency to abrade the stylus and the stylus electrode. To protect the delicate stylus electrode 60 (0.2×2.0 micrometers) from damage, it is desirable to locate it on the trailing face of the stylus body. In other words, the motion of a turntable-mounted record 162 is such that the portion of the record beneath the stylus 52 encounters the stylus electrode 60 last in the manner depicted in FIG. 5.

The subject video disc player is provided with an off-carriage stylus cleaning mechanism 150 in accordance with the principles of an invention disclosed in a commonly-assigned U.S. patent application of Hughes, entitled "DISC RECORD PLAYER HAVING STYLUS CLEANER". The stylus cleaning mechanism 150 includes a wiping element 152 affixed to a holder 154 which is slidably mounted for motion along a path defined by a pair of guide tracks 156 and 158. The guide tracks 156 and 158 are disposed angularly with respect to the front-to-back carriage path in the manner shown in FIG. 4. The cleaning element 152 can be made from any suitable material like velvet. A return spring secured to the holder 154 biases the holder against an arcuate stop 160. As the carriage 70 is translated to its off-record rest position near the front end of the player, it engages an upstanding, turned-up portion of the holder 154, and drives it away from the record center along the aforesaid angular path. The return spring causes the holder 154 to follow the carriage 70 when it is driven toward the record center for playback until the holder engages the arcuate stop 160.

The player control microcomputer 148 coordinates the activities of the carriage drive motor 140 and the stylus lifting/lowering device 90 to effect stylus cleaning as the carriage 70 is driven toward a turntable-supported record 162 for playback. The control microcomputer 148 issues pulses to the stepper motor 140 until the carriage 70 is advanced to an intermediate point (about 0.30 inches in from the home position) between the home position and a start-of-play position over the record (approximately 1.20 inches inward from the home position). At this point, the stylus lifting/lowering device 90 is energized to lower the stylus 52 onto the stylus wiping pad 152.

The player control microcomputer 148 waits for approximately 1.5 seconds to allow the stylus 52 to come to rest on the stylus cleaning pad 152, and then resumes the carriage drive. As the carriage 70 advances toward the record 172, the cleaning element 152 wipes the stylus tip to rid it from any dust and debris buildup. After the carriage 70 advances another 0.25 inches, the microcomputer 148 sends a command to the stylus lifting/lowering device 90 to raise the stylus 52. When the carriage 70 activates a landing switch, the microcomputer 148 again energizes the stylus lifting/lowering device 90 to gently lower the stylus 52 on a turntable-supported record 162 for playback. When the stylus 52 reaches its end-of-play position, the player control microcomputer 148 lifts the stylus up, and sends the carriage 70 to its rest position.

In a video disc player fitted with an off-carriage stylus cleaning mechanism of the Hughes type described above, it is possible to clean the stylus when carrier distress or other disturbances occur during playback by recycling the caddy in and out of the player, or by returning the carriage to the rest position off the edge of the record and then driving it back toward the record. The operator must subsequently relocate the section of the prerecorded material previously seen before the incidence of the carrier distress to resume playback.

It is desirable to clean the stylus 52 whenever a carrier distress situation developed during play, without having to recycle the carriage 70 to and from its off-record rest position. To this end, the video disc player 20 is fitted with a carriage-mounted stylus cleaner 200, shown in FIG. 6, in accordance with the aforementioned Brauer et al. invention. The in-arm stylus cleaner 200 includes a cleaner arm 202, carrying a cleaning element 204, pivotally mounted in the carriage 70 about a vertical pin 206. The cleaner arm 202 is subject to motion, in a plane substantially parallel to the turntable 132, between an advanced position and retracted position defined, respectively, by the wall of a resonator block 208 and an upstanding post 210 provided in the carriage 70.

The stylus cleaning element 204 comprises a piece of compliant sheet having an edge secured to the cleaner arm 202 such that the sheet extends away from the cleaner arm at substantially right angles to it, as can be seen in FIG. 7. Examples of materials suitable for the wiping element 202 include Butyl rubber, silicone rubber, etc. Illustrative dimensions of the cleaning element 204 are: length=0.175 inches, width=0.115 inches and thickness=0.008 inches. To secure the stylus cleaning element 204 to the cleaner arm 202, the cleaning element is stretched, slid sideways into a slot 212 provided in the cleaner arm, released and then pulled up until it stops against the cleaner arm to adjust the height. The perpendicular orientation of the compliant cleaning element 204 serves to accommodate the full range of the height variation (e.g., due to tolerance stackup) between the stylus 52 disposed in the raised position and the swingably-mounted cleaner arm 202 without the risk of damaging the stylus.

The in-arm stylus cleaner 200 further includes a solenoid 220 comprising an electrical winding 222 disposed about a non-magnetic core 224 and a tubular, slidably-mounted magnetic element 226 disposed in the air gap formed by the non-magnetic core. A coil spring 228 is arranged between one face of the plastic core 224 and a retaining washer 230 disposed on the slidable metal element 226 at one end thereof for biasing the metal element away from the air gap. The metal tube 226 is flared at its other end 232 to hold it in place.

An actuating member 240 has one end 242 hooked into a hole in the cleaner arm 202 and the other end 244 hooked into the hollow metal tube 226 through a hole therein. When the player control microcomputer 148 sends electrical current through the solenoid winding 222, it draws in the slidable element 226, which, in turn, retracts the cleaner arm 202 against the upstanding post 210 in the manner shown in phantom in FIG. 6. When the electrical current is removed from the winding 222, the biasing spring 228 drives the cleaner arm 202 back to its advanced position against the wall of the resonator block 208.

During playback, the in-arm stylus cleaning sequence is triggered under two circumstances—when the player control microcomputer 148 senses carrier distress for a certain duration of time (e.g., 3 seconds), and when the user operates the PAUSE button 30. When triggered for an in-arm stylus cleaning operation, the control microcomputer 148:

activates the cleaner solenoid 220 while the stylus 52 is down to cock the cleaner arm 202 against the upstanding post 210, operates the lifter electromagnet 94 to raise the stylus 52 to a position against the cartridge stop 64, waits for approximately 0.5 seconds to allow the stylus 52 to arrive at its raised position, releases the sweeper arm 202 to cause the compliant cleaning pad 204 to flick the stylus 52 in the right direction to free it from the dust and debris buildup, and reenergizes the lifter 90 to gently lower the stylus 52 onto the record 162 to resume the playback sequence. (When the in-arm stylus cleaning operation is caused by the activation of the PAUSE button 30, the player control microcomputer 148 waits for reactivation of the PAUSE button to set the stylus 52 back down on the record 162.)

To protect the stylus electrode 60, both the stylus cleaner mechanisms 150 and 200 wipe the stylus 52 such that the motion of the respective wiping elements 152 and 204 is from the stylus shoe toward the stylus electrode (in the manner similar to the motion of the disc 162 relative to the stylus as shown in FIG. 5).

As previously indicated, it is desirable to prevent accidental contact between the stylus 52 and the in-arm cleaner mechanism 20. To this end, the video disc player 20 is equipped with a carriage-mounted stylus protecting mechanism 250 in accordance with this invention. As can be seen from FIG. 6, the stylus protecting mechanism 250 includes a plunger 252 slidably mounted in the carriage 70. One end 254 of the plunger 252 extends through a hole in a side wall 256 of the carriage 70. The other end 258 of the plunger 252 is threaded through an opening in a support bracket 260 attached to the carriage 70. A spring 262 is arranged about the plunger 252 between the support bracket 260 and a step portion 264 of the plunger to bias it to protrude from the carriage 70 in the manner illustrated in FIG. 6.

When the player control microcomputer 148 lifts the stylus 52 up and sends the carriage 70 back at the end of a playback cycle, the front wall 266 of the player pushes the plunger 252 in as the carriage is driven to the home position, so that the portion 58 of the plunger engages a vertical portion 268 of the wire form 240 to lock the cleaner arm 202 in place. The plunger 252 blocks the retraction of the cleaner arm 202 to prevent its engagement with the delicate stylus 52 and the electrode 60 during handling and shipping. When the carriage 70 is advanced toward a turntable-supported record 162 (e.g., approximately 0.3 inches), the coil spring 262 causes the plunger 252 to retract the FIG. 6 position to, in turn, free the stylus cleaner mechanism 200.

As previously indicated, it is also desirable to disable the stylus lifter mechanism 90 when the carriage 70 is at the rest position to avoid inadvertent lowering of the stylus 52, for example, during handling and shipping. To this purpose, in accordance with another feature of the present invention, the plunger 252 is provided with an offset portion 270 in the manner illustrated in FIG. 8. When the carriage 70 is driven to the rest position, the offset portion 270 of the plunger 252 rides over the back portion 272 of the lifter bracket 92, shown in FIG. 3, to secure it in place. The retention of the lifter bracket 92 restrains the stylus 52, since the stylus arm 54 is captured between the lifter bracket and the cartridge stop 64.

According to a further modification of the above feature, the offset portion 270 of the plunger 252 is fitted with a leaf spring 274 to provide a downward force on the back portion 272 of the lifter bracket 92 when the carriage 70 reaches the rest portion. The leaf spring 274 serves to accommodate any variations in the height of the lifter bracket 92.

The subject stylus protecting mechanism 250 effectively protects the stylus 52 by securing the stylus lifter mechanism 90 and the stylus cleaner mechanism 200 during handling and shipping.

What is claimed is:

1. In a record player including a pickup stylus subject to engagement with a turntable-supported record during playback; said stylus being mounted at one end of a stylus arm having its other end yieldably supported in a translatable carriage which is subject to lateral motion between a rest position clear of said turntable and playback positions over said turntable; said player further having a selectively-activated means mounted in said carriage for lifting and lowering said stylus arm; said player additionally including a carriage-mounted stylus cleaning means for selectively cleaning said stylus; an apparatus comprising:

sensing means subject to conditioning in a first state and a second state in response to the disposition of said carriage away from said rest position and at said rest position respectively;

said sensing means, when disposed in said second state, disabling said carriage-mounted stylus cleaning means.

2. The apparatus as defined in claim 1 wherein said sensing means comprises a plunger slidably mounted to said carriage for motion between a first position and a second position; said apparatus further including means for biasing said plunger toward said first position; said plunger engaging a portion of said player as said carriage is driven toward said rest position; said engaging portion displacing said plunger to said second position thereof to inactivate said stylus cleaning means when said carriage occupies said rest position.

3. The apparatus as defined in claim 2 wherein said stylus cleaning means comprises a holder carrying a stylus wiping element and a selectively-energized means for deflecting said holder to wipe said stylus; said selectively-energized means including an actuating member coupled to said wiping element holder; said plunger, when disposed in said second position, blocking said actuating member to lock it in place as said carriage arrives at said rest position.

4. The apparatus as defined in claim 3 wherein said stylus lifting/lowering means includes a stylus arm bracket mounted for motion between a raised position and a lowered position; said plunger having a further portion subject to engagement with said stylus arm bracket to hold it in place when said plunger is occupying said second position thereof.

5. The apparatus as set forth in claim 4 wherein said further portion of said plunger is equipped with a leaf spring for engagement with said stylus arm bracket upon arrival of said carriage at said rest position to secure said stylus arm bracket.

* * * * *

UNITED STATES PATENT AND TRADEMARK OFFICE
CERTIFICATE OF CORRECTION

PATENT NO. : 4,442,517
DATED : April 10, 1984
INVENTOR(S) : Eric August Brauer

It is certified that error appears in the above—identified patent and that said Letters Patent is hereby corrected as shown below:

Col. 7, line 48,     "cleaner mechanism 20." should be -- cleaner mechanism 200. --;

Col. 7, line 66,     "the portion 58 of the" should be -- the portion 258 of the --;

Signed and Sealed this

Twenty-sixth Day of February 1985

[SEAL]

Attest:

DONALD J. QUIGG

*Attesting Officer*     *Acting Commissioner of Patents and Trademarks*